US006239689B1

(12) United States Patent
Croner, Jr.

(10) Patent No.: US 6,239,689 B1
(45) Date of Patent: May 29, 2001

(54) ELECTRONIC DOOR UNLOCKING SYSTEM

(76) Inventor: William C. Croner, Jr., 3222 Roosevelt Ave., Aliquippa, PA (US) 15001-4643

(*) Notice: Subject to any disclaimer, the term of this patent is extended or adjusted under 35 U.S.C. 154(b) by 0 days.

(21) Appl. No.: 09/137,060

(22) Filed: Aug. 20, 1998

(51) Int. Cl.[7] ........ G06F 7/00

(52) U.S. Cl. ........ 340/5.2; 70/278.2; 340/5.6; 340/5.65

(58) Field of Search ........ 340/825.31, 5.2, 340/5.6, 5.65; 235/380; 439/133; 70/413, 278.2, 278.3, 283.1, 401

(56) References Cited

U.S. PATENT DOCUMENTS

| | | | |
|---|---|---|---|
| 4,295,350 | * 10/1981 | Grinage | 70/454 |
| 5,195,341 | * 3/1993 | Nieuwkoop | 70/278 |
| 5,386,713 | * 2/1995 | Wilson | 70/280 |

OTHER PUBLICATIONS

Paul Renton, Electronic Combination Lock, Radio–electronic, p. 107, Nov. 1987, Nov. 1998.*

* cited by examiner

*Primary Examiner*—Michael Horabik
*Assistant Examiner*—Matsuichiro Shimizu

(57) ABSTRACT

An electronic door unlocking system comprising an electromagnet within a door adjacent to a deadbolt to retract the deadbolt upon energization of the electromagnet and an associated spring to advance the deadbolt into locking orientation with the recess upon a deactivation of the electromagnet. Also provided is a key with a long part formed with a first computer chip at its free end and a short part spaced from the long part. A sensor assembly is provided in the door knob with an interior component with a second computer chip contactable with the first computer chip of the long part of the key. The sensor assembly has an exterior component with a plurality of apertures adapted to allow the passage of the long part therethrough. The interior and exterior components are spaced at a distance essentially equal to the difference of length between the long and short parts of the key. Electrical lines couple the interior and exterior components of the sensor assembly and the electromagnet whereby when the key enters the knob with the long part contacting the interior component and the short part contacting the exterior component and with the second computer chip contacting the first computer chip, the deadbolt will activate the electromagnet to allow opening of the door.

6 Claims, 2 Drawing Sheets

FIG 1
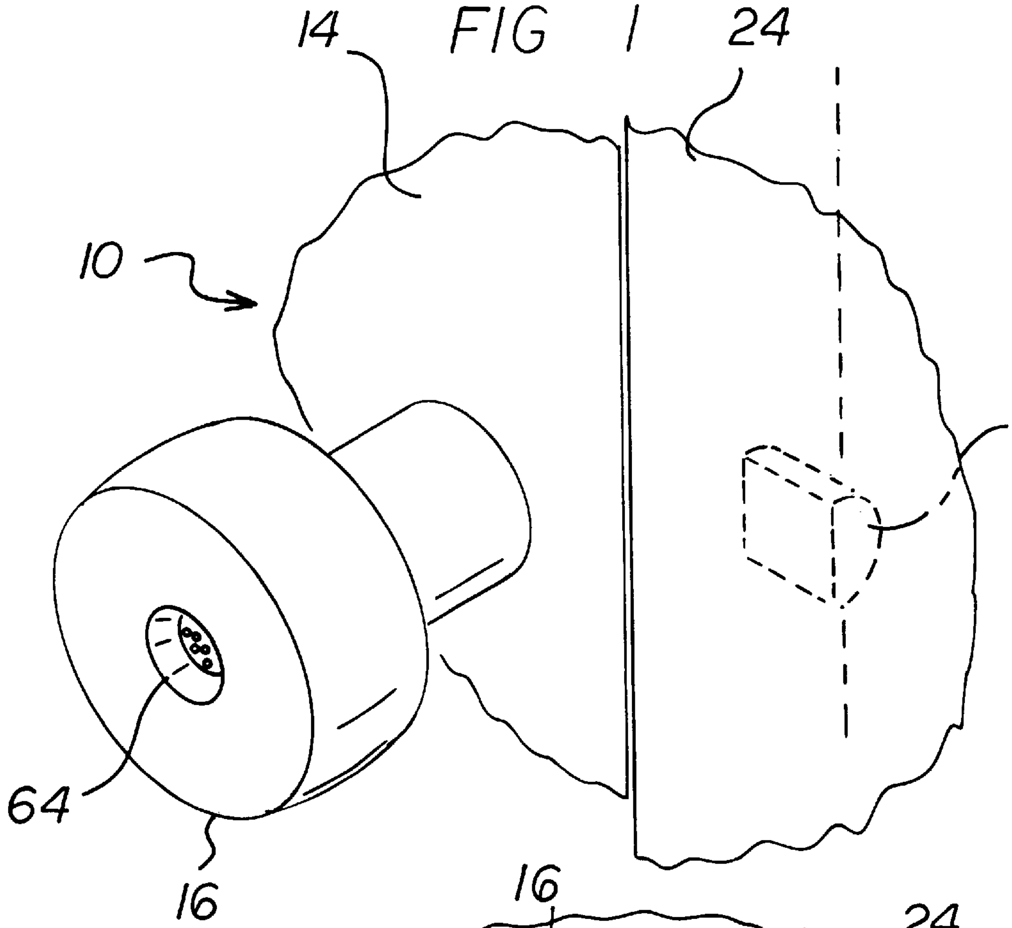
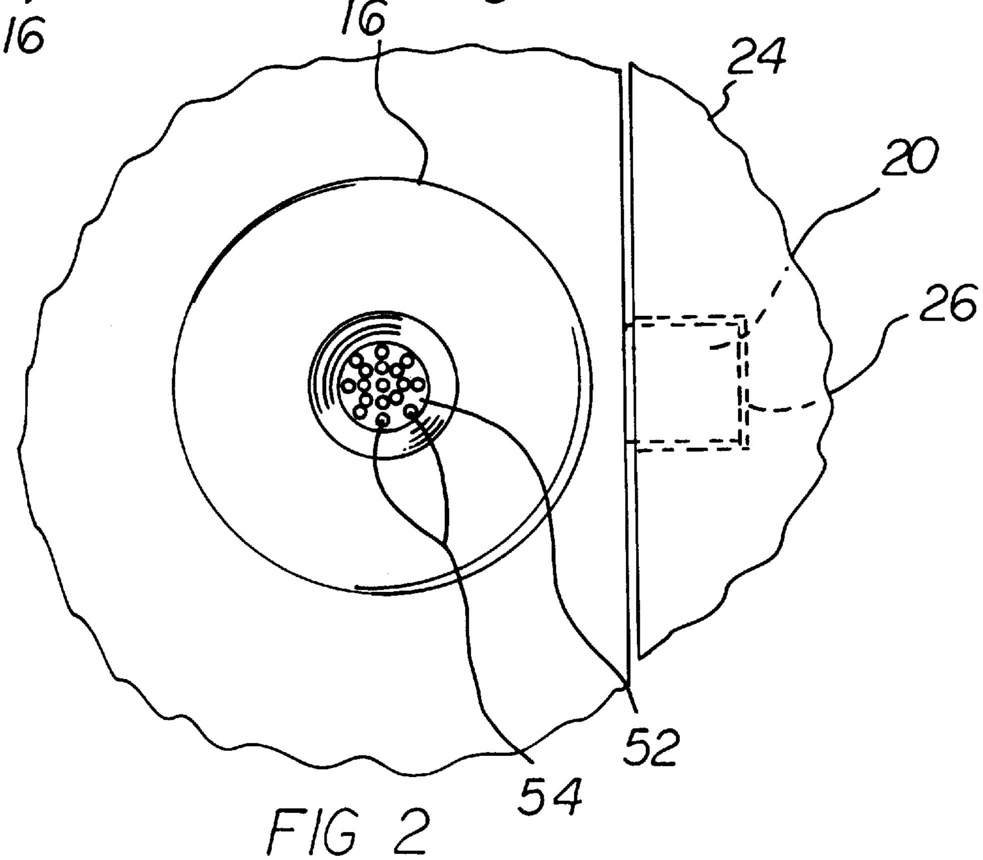
FIG 2

FIG 3
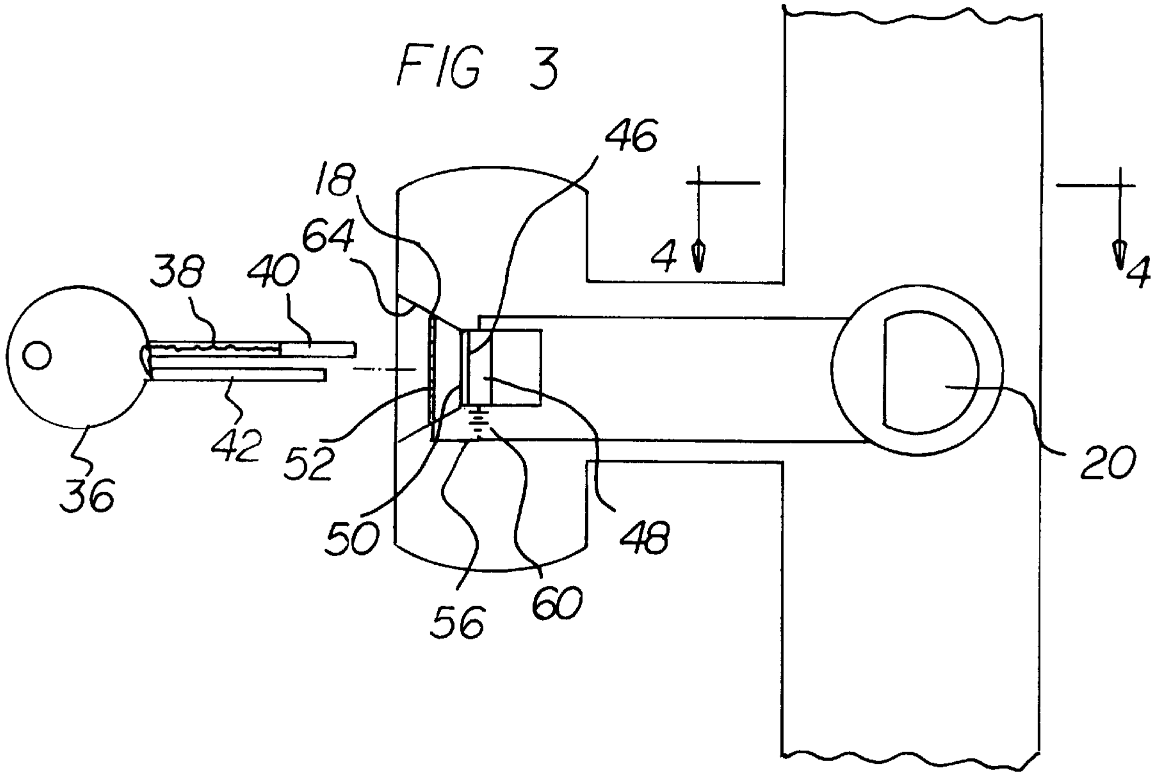
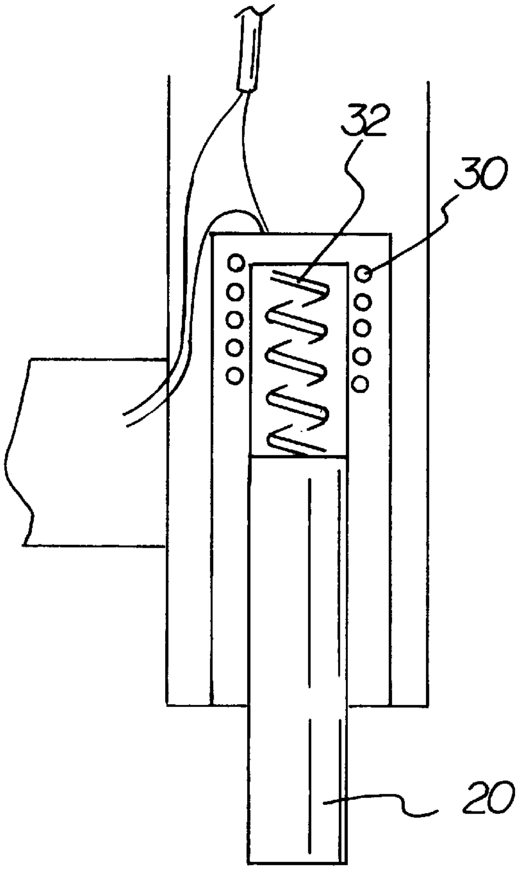
FIG 4

ELECTRONIC DOOR UNLOCKING SYSTEM

BACKGROUND OF THE INVENTION

1. Field of the Invention

The present invention relates to an electronic door unlocking system and more particularly pertains to unlocking a door with an electromagnet and a computerized sensor assembly and computerize.

2. Description of the Prior Art

The use of door locks of known designs and configurations is known in the prior art. More specifically, door locks of known designs and configurations heretofore devised and utilized for the purpose of unlocking doors through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,179,325 to Aragon, Jr. discloses a Touch-Sensitive Illuminable Door Lock. U.S. Pat. No. 4,745,527 to Belverio, Jr. et al. discloses an Illuminated Door Lock Scratch Guard. U.S. Pat. No. 4,777,570 to Littles discloses an Illuminated Doorknob Lock. U.S. Pat. No. 4,295,350 to Grinage discloses a Keyhole Sighter. Lastly, U.S. Pat. Des. No. 338,735 to Gladhill discloses a Battery Powered Light for a Door Knob.

In this respect, the electronic door unlocking system according to the present invention substantially departs from the conventional concepts and designs of the prior art, and in doing so provides an apparatus primarily developed for the purpose of unlocking a door with an electromagnet and a computerized sensor assembly and computerized key.

Therefore, it can be appreciated that there exists a continuing need for a new and improved electronic door unlocking system which can be used for unlocking a door with an electromagnet and a computerized sensor assembly and computerized key. In this regard, the present invention substantially fulfills this need.

SUMMARY OF THE INVENTION

In view of the foregoing disadvantages inherent in the known types of door locks of known designs and configurations now present in the prior art, the present invention provides an improved electronic door unlocking system. As such, the general purpose of the present invention, which will be described subsequently in greater detail, is to provide a new and improved electronic door unlocking system and method which has all the advantages of the prior art and none of the disadvantages.

To attain this, the present invention essentially comprises a new and improved electronic door unlocking system for unlocking a door with an electromagnet and a computerized sensor assembly and computerized key comprises, in combination a door with a knob, lock and axially shiftable dead bolt. The system also comprises a frame that pivotally supports the door with a recess to receive the deadbolt for locking purposes and to unlock the door upon retraction of the deadbolt from the recess. An electromagnet is within the door adjacent to the deadbolt to retract the deadbolt upon energization of the electromagnet and an associated spring to advance the deadbolt into locking orientation with the recess upon a deactivation of the electromagnet. A key is provided with a long part formed with a first computer chip at its free end and a short part spaced from the long part. A sensor assembly is in the door knob and has an interior component with a second computer chip contactable with the first computer chip of the long part of the key. The sensor assembly has an exterior component with a plurality of apertures adapted to allow the passage of the long part therethrough. The interior and exterior components are spaced at a distance essentially equal to the difference of length between the long and short parts of the key. Also provided are electrical lines for coupling the interior and exterior components of the sensor assembly and the electromagnet whereby when the key enters the knob with the long part contacting the interior component and the short part contacting the exterior component and with the second computer chip contacting the first computer chip, the deadbolt will activate the electromagnet to allow opening of the door. Lastly provided is a funnel in the doorknob in advance of the exterior component to effect the guiding of the key into operative position.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronic door unlocking system which has all of the advantages of the prior art door locks of known designs and configurations and none of the disadvantages.

It is another object of the present invention to provide a new and improved electronic door unlocking system which may be easily and efficiently manufactured and marketed.

It is further object of the present invention to provide a new and improved electronic door unlocking system which is of durable and reliable constructions.

An even further object of the present invention is to provide a new and improved electronic door unlocking system which is susceptible of a low cost of manufacture with regard to both materials and labor, and which accordingly is then susceptible of low prices of sale to the consuming public, thereby making such electronic door unlocking system economically available to the buying public.

Even still another object of the present invention is to provide an electronic door unlocking system for unlocking a door with an electromagnet and a computerized sensor assembly and computerized key.

Lastly, it is an object of the present invention to provide a new and improved electronic door unlocking system comprising an electromagnet within a door adjacent to a deadbolt to retract the deadbolt upon energization of the electromagnet and an associated spring to advance the deadbolt into locking orientation with the recess upon a deactivation of the electromagnet. Also provided is a key with a long part formed with a first computer chip at its free end and a short part spaced from the long part. A sensor assembly is provided in the door knob with an interior component with a second computer chip contactable with the first computer chip of the long part of the key. The sensor assembly has an exterior component with a plurality of apertures adapted to allow the passage of the long part therethrough. The interior and exterior components are spaced at a distance essentially equal to the difference of length between the long and short parts of the key. Electrical lines couple the interior and exterior components of the sensor assembly and the electromagnet whereby when the key enters the knob with the long part contacting the interior component and the short part contacting the exterior component and with the second computer chip contacting the first computer chip, the deadbolt will activate the electromagnet to allow opening of the door.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the electronic door unlocking system constructed in accordance with the principles of the present invention.

FIG. 2 is a front elevational view of the system shown in FIG. 1.

FIG. 3 is a side elevational view of the door and lock shown in schematic form.

FIG. 4 is a cross-sectional view taken along line 4—4 of FIG. 3.

The same reference numerals refer to the same parts through the various Figures.

DESCRIPTION OF THE PREFERRED EMBODIMENT

With reference now to the drawings, and in particular to FIG. 1 thereof, the preferred embodiment of the new and improved electronic door unlocking system embodying the principles and concepts of the present invention and generally designated by the reference numeral 10 will be described.

The present invention, the electronic door unlocking system 10 is comprised of a plurality of components. Such components are individually configured and correlated with respect to each other so as to attain the desired objective.

More specifically, the new and improved electronic door unlocking system for unlocking a door with an electromagnet and a computerized sensor assembly and computerized key comprises, in combination a door 14 with a knob 16, lock 18 and axially shiftable dead bolt 20. The system also comprises a frame 24 that pivotally supports the door with a recess 26 to receive the deadbolt for locking purposes and to unlock the door upon the retraction of the deadbolt from the recess.

An electromagnet 30, or solenoid, is positioned within the door adjacent to the deadbolt to retract the deadbolt upon energization of the electromagnet. An associated spring 32 is included to advance the deadbolt into locking orientation with the recess upon a deactivation of the electromagnet.

A key 36 is provided with a long part 38 formed with a first computer chip 40, or integrated circuit, at its free end. A short part 42 of the key is positioned in spaced relationship with the long part. The computer chip 40 has a first terminal at the free end of the long part 38 of the key and a second terminal which resides within a remaining portion of the long part which is insulated. The second terminal of the computer chip is connected to the short part of the key at an inboard end thereof. For reasons that will soon become apparent, the short part of the key which is connected to the second terminal of the computer chip is conductive.

A sensor assembly 46 is in the door knob and has an interior component 48 with a second computer chip 50, or integrated circuit, with a terminal contactable with the first terminal of the first computer chip of the long part of the key. The sensor assembly has an exterior component 52 including a circular conductive plate with a plurality of apertures 54 formed therein. The plate of the exterior component is adapted to allow the passage of the long part therethrough. The interior and exterior components of the sensor assembly are spaced at a distance essentially equal to a difference of length between the long and short parts of the key.

Also provided are electrical lines 56 for coupling the exterior and interior components of the sensor assembly and the electromagnet. Specifically, the second computer chip is connected to a first terminal of a battery 60. The electromagnet is connected between the second computer chip and a second terminal of the battery. Further, the plate of the exterior component is connected to the second terminal of the battery. By this interconnection, when the key is inserted within the sensor assembly, the long part of the key passes through the conductive plate with the first terminal of the first computer chip of the key contacting the terminal of the second computer chip of the sensor assembly. Upon such interconnection, the short part of the key contacts the conductive plate of the exterior component of the sensor assembly such that a current path is completed between the terminal of the second computer chip, through the first computer chip and to the second terminal of the battery. Upon the current path being completed, the current is monitored and if proper characteristics are detected by the first computer chip, the first computer chip activates the electromagnet to allow opening of the door. To accomplish, the foregoing operation, the first computer chip may comprise a uniquely designed RC circuit, timer circuit or the like. Further, the second computer chip may include a current dependent switch with current detecting circuitry which serves to supply power to the electromagnet upon the detection of the proper current. Lastly provided is a funnel 64 in the doorknob in advance of the exterior component of the sensor assembly to effect the guiding of the key into operative position.

As described hereinabove, the system of the present invention is a doorknob handle which funnels a specially designed key into the locking mechanism.

The doorknob is concave-shaped so that the key is automatically directed toward the tumbler. The key is designed so that no matter in which position it is inserted, it catches the tumbler and unlocks the door. Once the key enters the locking chamber, a light positioned above the door knob is illuminated. Produced from metal, the system measures 2½ inches high, 5 to 8 inches long, and 2½ to 3 inches wide.

The appealing features of the system are its convenience, ease of use, improved safety and security, and improved confidence and peace of mind. People no longer have to fumble around outside a locked door to find their key. A key would not have to be inserted perfectly into the locking mechanism, as the lock itself directs the specially designed key into the tumbler. The quick and easy entry to a home lessens a person's chance of being victimized by crime.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic door unlocking system for unlocking a door with an electromagnet and a computerized sensor assembly and computerized key comprising, in combination:

a door with a knob, lock and axially shiftable dead bolt;

a frame pivotally supporting the door with a recess to receive the deadbolt for locking purposes and to unlock the door upon retraction of the deadbolt from the recess;

an electromagnet within the door adjacent to the deadbolt to retract the deadbolt upon energization of the electromagnet and an associated spring to advance the deadbolt into an extended locking orientation with the recess upon a deactivation of the electromagnet;

a key with a long part formed with a first computer chip at its free end and a short part in a spaced and substantially parallel relationship with the long part, the key forming an electrically conductive path between the long part and the short part, as a part of a circuit including the electromagnet and a power source;

a sensor assembly in the door knob having a conductive interior component, the interior component having a second computer chip contactable with the first computer chip of the long part of the key when the long part is inserted into said interior component, the sensor assembly having a conductive exterior component with a plurality of apertures adapted to allow the passage of the long part of the key therethrough, the interior and exterior components being spaced a distance essentially equal to the difference of length between the long and short parts of the key;

a power source for activating the electromagnet;

electrical lines coupling the conductive interior and exterior components of the sensor assembly and the electromagnet such that insertion of the key into the knob with the long part contacting the conductive interior component and the short part contacting the conductive exterior component and with the second computer chip contacting the first computer chip, the long and short parts of the key form a conductive path between the exterior component and the interior component for activating the electromagnet to retract the deadbolt from the recess to allow opening of the door; and a funnel in the doorknob in advance of the exterior component to effect the guiding of the key into operative position.

2. An electronic door unlocking system comprising:

an electromagnet within a door adjacent to a deadbolt to retract the deadbolt upon energization of the electromagnet and an associated spring to advance the deadbolt into locking orientation with the recess upon a deactivation of the electromagnet;

a key with control circuitry mounted thereon with a terminal, the key having a long part formed with a first computer chip at its free end and a short part in a spaced and substantially parallel relationship with the long part, the key forming an electrically conductive path between the long part and the short part, as a part of a circuit including the electromagnet and a power source; and a sensor assembly in the door knob having a sensor assembly with a terminal, wherein the sensor assembly is connected to the electromagnet;

wherein upon contact between the terminals of the key and sensor assembly, the sensor assembly activates the electromagnet only if verification of the control circuitry is successful.

3. The system as set forth in claim 2 and further including a funnel in the doorknob in advance of the sensor assembly to effect the guiding of the terminal of the control circuitry of the key into contact with the terminal of the sensor assembly.

4. The system as set forth in claim 2 wherein the sensor assembly includes a contact membrane spaced from the terminal thereof, wherein a second terminal of the control circuitry communicates with the contact membrane.

5. The system as set forth in claim 4 wherein the contact membrane includes a plate with a plurality of apertures formed therein.

6. An electronic door unlocking system for unlocking a door with an electromagnet and a computerized sensor assembly and computerized key comprising, in combination:

a door with a knob, lock and axially shiftable dead bolt;

a frame pivotally supporting the door with a recess to receive the deadbolt for locking purposes and to unlock the door upon retraction of the deadbolt from the recess;

an electromagnet within the door adjacent to the deadbolt to retract the deadbolt upon energization of the electromagnet and an associated spring to advance the deadbolt into locking orientation with the recess upon a deactivation of the electromagnet;

wherein the key has a long part formed with a first computer chip at its free end and a short part in a spaced relationship with the long part, such that the key forms a conductive path as a part of a circuit including the electromagnet;

wherein the sensor assembly in the door knob having an interior component with a second computer chip contactable with the first computer chip of the long part of the key, the sensor assembly having an exterior component with a plurality of apertures adapted to allow the passage of the long part therethrough, the interior and exterior components being spaced a distance essentially equal to the difference of length between the long and short parts of the key;

electrical lines coupling the interior and exterior components of the sensor assembly and the electromagnet whereby when the key enters the knob with the long part contacting the interior component and the short part contacting the exterior component and with the second computer chip contacting the first computer chip, the deadbolt will activate the electromagnet to allow opening of the door; and a power source located in the electrical line to activate the second computer chip and the electromagnet.

* * * * *